(12) United States Patent
Shono et al.

(10) Patent No.: US 8,564,894 B2
(45) Date of Patent: Oct. 22, 2013

(54) LENS BARREL

(75) Inventors: Naho Shono, Kodaira (JP); Akira Funahashi, Mitaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 537 days.

(21) Appl. No.: 12/188,894

(22) Filed: Aug. 8, 2008

(65) Prior Publication Data

US 2009/0046381 A1  Feb. 19, 2009

(30) Foreign Application Priority Data

Aug. 16, 2007  (JP) .................................. 2007-212176

(51) Int. Cl.
*G02B 7/02*  (2006.01)

(52) U.S. Cl.
USPC ............................. 359/823; 359/819; 359/822

(58) Field of Classification Search
USPC ........................... 359/811, 815, 819, 822–826
See application file for complete search history.

(56) References Cited

U.S. PATENT DOCUMENTS

2002/0149859 A1 * 10/2002 Muto et al. .................... 359/694
2008/0024888 A1 *  1/2008 Hattori et al. ................ 359/823

FOREIGN PATENT DOCUMENTS

| JP | 2004-045566 |   | 2/2004 |
| JP | 2004045566 A | * | 2/2004 |
| JP | 2006-64838 |   | 3/2006 |

OTHER PUBLICATIONS

Notice of Reasons for Refusal, Japanese Patent Application No. 2007-212176, Sep. 30, 2011.
Examiner's Decision of Refusal, Japanese Patent Application No. 2007-212176, Apr. 16, 2012.

* cited by examiner

*Primary Examiner* — Ricky Mack
*Assistant Examiner* — Mahidere Sahle
(74) *Attorney, Agent, or Firm* — Finnegan, Henderson, Farabow, Garrett & Dunner, L.L.P.

(57) ABSTRACT

A lens barrel having: an imaging optical system including, a moving lens group movable in a direction of an optical axis, a first aperture disposed on an object side of the moving lens group, and a second aperture disposed on an image plane side of the moving lens group; a first optical path regulating section formed on the image plane side of the first aperture; and a second optical path regulating section integrally formed with a holding frame for holding the moving lens group, wherein the first optical path regulating section and the second optical path regulating section are configured to block, of light fluxes that pass through the first aperture to enter the second aperture, those that do not pass through the second lens group as a moving lens.

20 Claims, 4 Drawing Sheets

*PRIOR ART*

LENS BARREL

RELATED APPLICATION

This application is based on Japanese Patent Application No. 2007-212176 filed on Aug. 16, 2007 in Japanese Patent Office, the entire content of which is hereby incorporated by reference.

TECHNICAL FIELD

The present invention relates to a lens barrel used in an imaging apparatus such as a video camera or still camera.

BACKGROUND

There has been a strong demand for the further downsizing of electronic cameras such as video cameras and still cameras. This is accompanied by the demand for miniaturization of the major units constituting the cameras.

One of the techniques known in the conventional art is a zoom lens barrel built into a video camera wherein the main unit of the drive motor of the moving lens group arranged on the object side is placed on the image plane side, and the main body of the drive motor of the moving lens group on the image plane side is arranged on the object side (e.g.: Japanese Unexamined Patent Application Publication No. 2006-64838).

PROBLEMS TO BE SOLVED BY THE INVENTION

In the lens barrel described in the aforementioned Patent Document, however, the main body of the drive motor of the moving lens group on the image plane side is arranged in the moving area of the moving lens group provided on the object side, and the main body of the drive motor of the moving lens group on the object side is arranged in the moving area of the moving lens group installed on the image plane side.

In this case, the main body of the motor cannot be arranged close to the optical axis in the conventional art, and the lens barrel diameter has to be increased. This problem will be described with reference to FIGS. 1 (a), 1 (b) and 2.

FIGS. 1 (a) and (b) are cross sectional views representing the outline of the lens barrel including the conventional variable magnification imaging optical system. FIG. 1 (a) shows the status of the wide-angle end, while FIG. 1 (b) illustrates the status of the telephoto end.

The lens barrel shown in this drawing includes an imaging optical system that is a zoom lens configured with a first fixed lens group 11, a second lens group 12 movable in the direction of optical axis, a third fixed lens group 13, and a fourth fixed lens group 12 movable in the direction of optical axis.

The first lens group 11 is made up of a first lens 1, second lens 2 and third lens 3, and is fixed on the main barrel 15. The second lens group 12 is composed of a fourth lens 4, fifth lens 5 and sixth lens 6, and is supported by the second lens group barrel 22 as a movable holding frame. A third lens group 13 is composed of a seventh lens 7, eighth lens 8 and ninth lens 9. It is supported by the third lens group barrel 23, and is fixed on the main barrel 15. A fourth lens group 14 is made of a tenth lens 10 as a single lens in this example, and is supported by the movable fourth lens group barrel 24.

The second lens group barrel 22 and fourth lens group barrel 24 are guided by the guide shaft (not illustrated) and can be moved in the direction of optical axis.

The second lens group barrel 22 is moved in the direction of optical axis by the stepping motor and lead screw (not illustrated).

The fourth lens group barrel 24 contains a lead screw 42 rotated by the stepping motor 41 and an engagement section (not illustrated), and is moved in the direction of optical axis. The reference numeral 31 indicates an aperture unit and is fixed onto the main barrel 15.

As illustrated, the stepping motor 41 for moving the fourth lens group 14 is arranged in a position that overlaps with the moving area of the second lens group 12 in the direction of optical axis O.

The second lens group barrel 22 as a holding frame to hold the second lens group 12 as a moving lens group is formed integrally with the flange 22t for blocking the light other than the imaging light flux. Further, an aperture (called the first aperture) 15k is formed on the image plane side of the first lens group 11 and on the object side of the second lens group 12. Further, there is an aperture (called the second aperture) 31k which is formed by the aperture of the aperture unit 31 arranged further down on the image plane side than the second lens group 12.

As shown in FIG. 1 (a), the flange 22t formed on the second lens group barrel 22 is intended to block unwanted light especially in the area shown by A connecting between the boundaries of the first aperture 15k and the second aperture 31k. The outer diameter of the flange 22t is larger than the inner diameter of the first aperture 15k. This arrangement ensures that light flux other than the light flux passing through the second lens group 12 does not enter the subsequent lens groups directly.

FIG. 2 is a cross sectional view of the conventional lens barrel of FIG. 1 wherein the main body of the motor is moved in the direction of optical axis O and the lens barrel is made slender. FIG. 2 illustrates the status of the wide-angle end.

As shown in FIG. 2, when arranged in such a way that the stepping motor 41 is moved toward the optical axis O, the size of the flange 22t cannot be increased sufficiently in the vicinity of the stepping motor 41, as illustrated, because of the need to ensure that the flange 22t of the second lens group barrel 22 does not interfere with the main barrel 15 in the moving area.

In this case, out of the unwanted light in the area "A" connecting between the first aperture 15k and the second aperture 31k, the light flux shown by an oblique line cannot be blocked. This will adversely affect the captured image and will deteriorate the image quality. In other words, the image quality will be deteriorated beyond commercial use, merely by reducing the outer diameter of the lens barrel.

The object of the present invention is to solve the aforementioned problems, and to provide a small-sized lens barrel capable of blocking unwanted light and ensuring a high-quality image when the outer diameter of the lens barrel is reduced.

SUMMARY

One aspect of the present invention is a lens barrel comprising: an imaging optical system including, a moving lens group movable in a direction of an optical axis, a first aperture disposed on an object side of the moving lens group, and a second aperture disposed on an image plane side of the moving lens group; a first optical path regulating section formed on the image plane side of the first aperture; and a second optical path regulating section integrally formed with a holding frame for holding the moving lens group, wherein the first optical path regulating section and the second optical path regulating section are configured to block, of light fluxes that pass through the first aperture to enter the second aperture, those that do not pass through the second lens group as a moving lens.

Another aspect of the present invention is a lens barrel comprising: an imaging optical system including, a fixed lens group which is disposed therein on a most object side in a direction of an optical axis, a first aperture disposed on an image plane side of the fixed lens group, a moving lens group movable in a direction of the optical axis, the moving lens group being disposed on an image plane side of the first aperture, a holding frame which holds the moving lens, and a second aperture configured by an aperture unit which is disposed on an image plane side of the moving lens group; a first optical path regulating section formed on the image plane side of the first aperture; and a second optical path regulating section integrally formed with a holding frame for holding the moving lens group, wherein the first optical path regulating section and the second optical path regulating section are configured to block, of light fluxes that pass through the first aperture to enter the second aperture, those that do not pass through the second lens group as a moving lens.

DESCRIPTION OF THE PREFERRED EMBODIMENT

Figure 1:
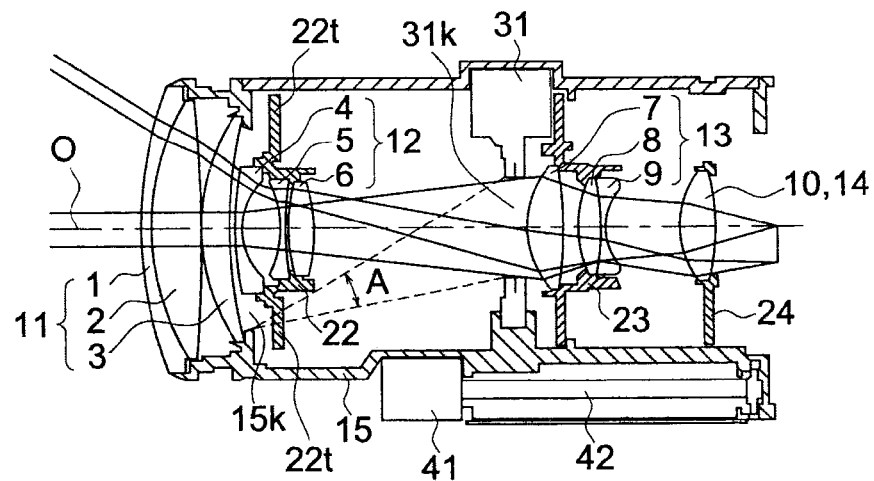
FIGS. 1 (a) and (b) are cross sectional views representing the outline of the lens barrel including the conventional variable magnification imaging optical system.
Figure 1:
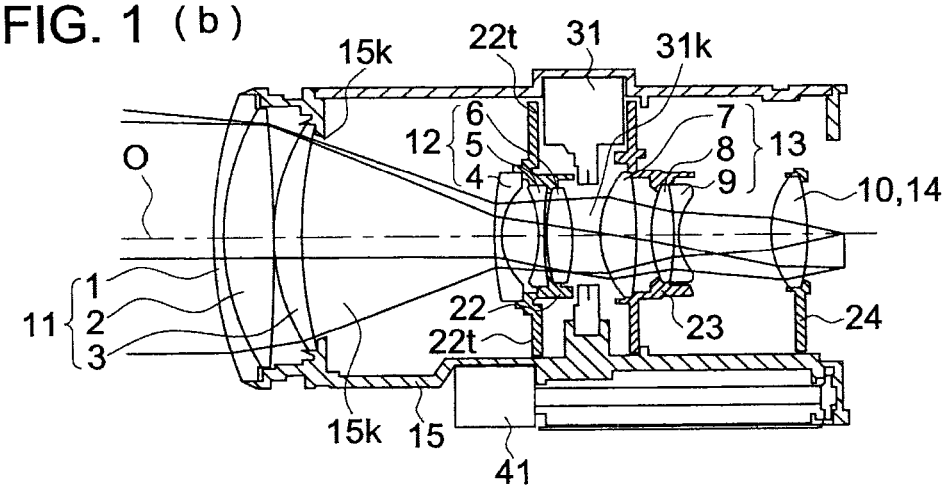

The following describes the details of the present invention with respect to embodiments, without the present invention being restricted thereto.

FIGS. 3(a) and 3(b) are cross sectional views representing the outline of the lens barrel 100 including the variable magnification imaging optical system in the present embodiment. FIG. 3(a) shows the status of the wide-angle end, while FIG. 3(b) represents the status of the telephoto end.

The lens barrel 100 of FIGS. 3(a) and 3(b) includes an imaging optical system as a zoom lens including a fixed lens group 11, a second lens group 12 movable in the direction of optical axis, a third fixed lens group 13, and a fourth lens group movable in the direction of optical axis.

The first lens group 11 is a fixed lens group made up of a first lens 1, second lens 2, and third lens 3, and is fixed on the main barrel 15. The second lens group 12 is made up of a fourth lens 4, fifth lens 5 and sixth lens 6, and is held by a second lens group barrel 22 as a movable holding frame. The third lens group 13 includes a seventh lens 7, eighth lens 8 and ninth lens 9. It is held by a third lens group barrel 23, and is fixed on the main barrel 15. The fourth lens group 14 is formed of a tenth lens 10 as a single lens in this example, and is held by a fourth movable lens group barrel 24.

The second lens group barrel 22 and the fourth lens group barrel 24 are guided by the guide shaft (not illustrated) and are movable in the direction of optical axis.

The second lens group barrel 22 has a lead screw driven by a stepping motor (not illustrated) and an engagement section, and is moved in the direction of optical axis.

The fourth lens group barrel 24 has a lead screw 42 driven by the stepping motor 41 and an engagement section (not illustrated), and is moved in the direction of optical axis. The reference numeral 31 indicates an aperture unit, which is fixed on the main barrel 15.

On the object side of the second lens group 12, an aperture (called the first aperture) 15k is formed on the image plane of the first lens group 11. Further, there is an aperture (called the second aperture) 31k which is formed by the aperture of the aperture unit 31 arranged on the image plane side relative to the second lens group 12.

In the lens barrel 100 of the present embodiment, the stepping motor 41 for moving the fourth lens group 14 is arranged at a position partly overlapping the moving area of the second lens group 12 in the direction of optical axis O. Further, to make the entire lens barrel slender, the stepping motor 41 is arranged closer to the optical axis O, similar to the case of the lens barrel in FIG. 2.

Figure 2:
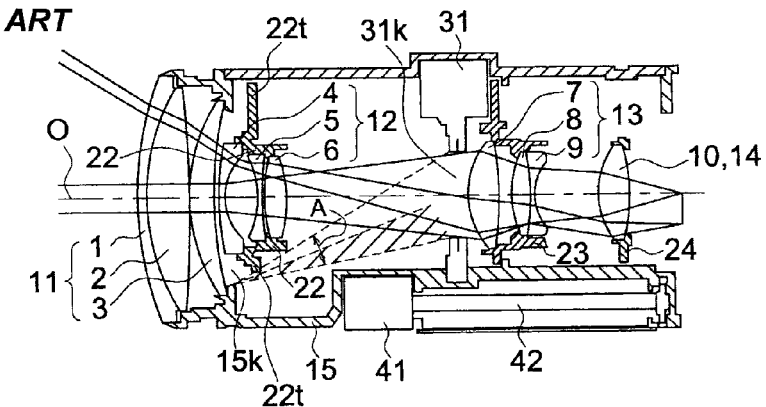
FIG. 2 is a cross sectional view representing the conventional lens barrel which FIGS. 1 (a) and (b) disclose, wherein the main body of the motor is moved in the direction of optical axis O and the lens barrel is made slender.
Figure 3:
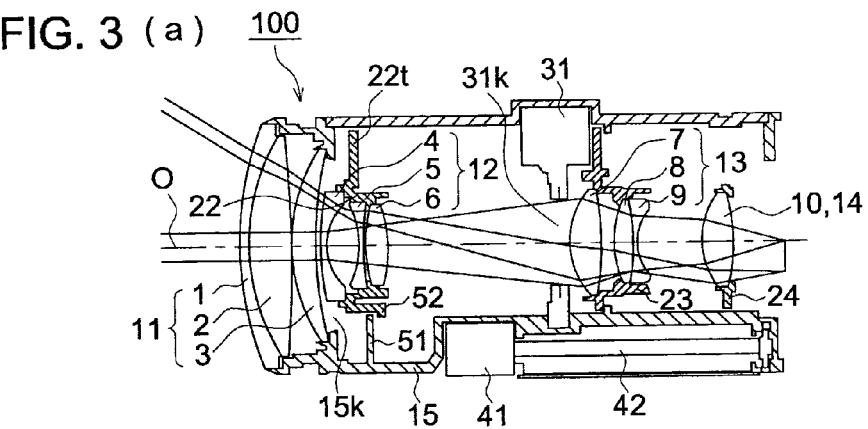
FIGS. 3 (a) and (b) are cross sectional views representing the outline of the lens barrel including the variable magnification imaging optical system in the present embodiment.
Figure 3:
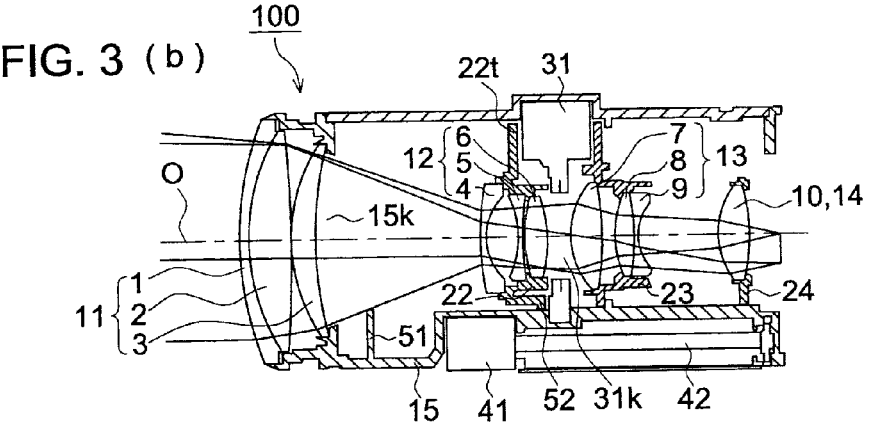

The lens barrel 100 of the present invention in FIGS. 3(a) and 3(b) is different from the lens barrel of FIG. 2 in the following points:

As shown in FIGS. 3 (a) and (b), the first optical path regulating section 51 formed on the image plane side relative to the first aperture 15k is like a screen formed in the direction towards optical axis O on the main barrel 15. In order not to block the imaging light flux, this first optical path regulating section 51 is formed at the height of the outermost imaging light flux in the variable magnification area of the imaging optical system, or is formed by a slight gap given to the outermost imaging light flux, as shown in FIG. 3 (b).

Further, the second optical path regulating section 52 is arranged at the position of the second lens group barrel 22 corresponding to the stepping motor 41 and the second optical path regulating section 52 is integrally formed at a position different from the flange 22t in the direction of the optical axis at the second lens group barrel 22, wherein the second lens group barrel 22 is a holding frame for holding the second lens group 12 as a moving lens group. The second optical path regulating section 52 is formed further down on the image plane side than the first optical path regulating section 51.

Figure 4:
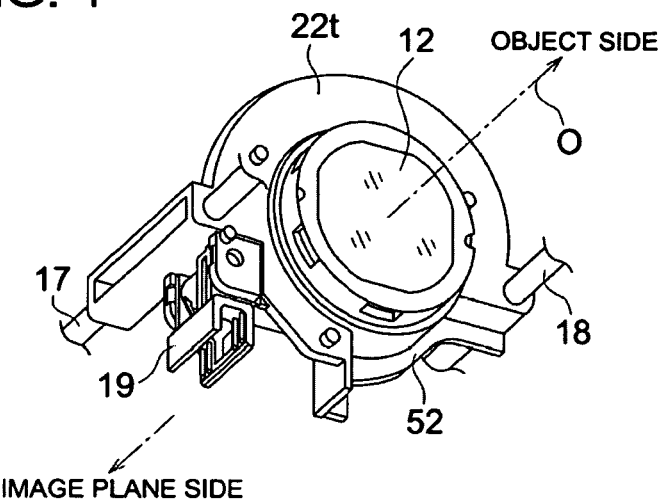
FIG. 4 is a perspective view showing the approximate configuration of the second lens group barrel as a holding member.

FIG. 4 is a perspective view showing the approximate configuration of the second lens group barrel 22 as a holding member.

The reference numbers 17 and 18 of FIG. 4 indicate the guide shafts for guiding the second lens group barrel 22 in the direction of optical axis O, and 19 denotes an engagement section for engagement with the lead screw (not illustrated).

As shown in the drawing, the second lens group barrel 22 is provided with the flange 22t which is long in the radial direction with respect to optical axis O and a second optical path regulating section 52 which is shorter than the flange 22t in the direction of optical axis at a position displaced to the image plane side.

Going back to FIGS. 3 (a) and (b), the first optical path regulating section 51 and the second optical path regulating section 52 are overlapped with each other at the wide-angle end and at the focal distance in the vicinity thereof, as shown in FIG. 3 (a), so that, of the light fluxes that pass through the first aperture 15k to enter the second aperture 31k, those that do not pass through the second lens group 12 as a moving lens are blocked.

Figure 5:
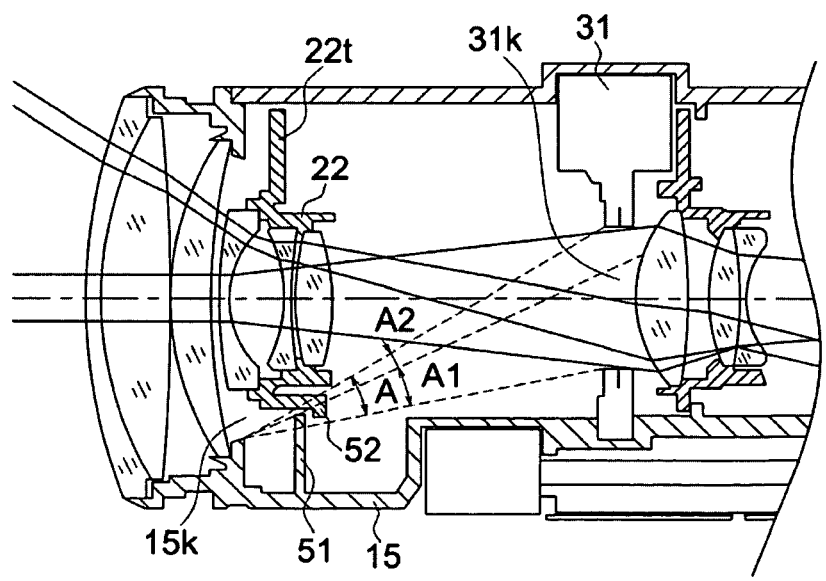
FIG. 5 is a cross sectional view showing the enlarged view of the peripheries of the first and second optical path regulating sections in the wide-angle end status of the lens barrel in the present embodiment shown in FIG. 3 (a)

FIG. 5 is a cross sectional view showing the enlarged view of the peripheries of the first and second optical path regulating sections for the wide-angle end of the lens barrel 100 in the present embodiment shown in FIG. 3 (a).

As shown in FIG. 5, of the unwanted light in the area shown by A of the drawing connecting the first aperture 15k and the second aperture 31k, that the area A1 is blocked by the first optical path regulating section 51, and the unwanted light in the area A2 is blocked by the second optical path regulating section 52. In other words, of the light fluxes passing through the first aperture 15k to enter the second aperture 31k, the unwanted light fluxes not passing through the second lens group 12 are blocked by both the first optical path regulating section 51 and the second optical path regulating section 52.

Even when the main barrel 15 is formed slender and the outer shape of the second optical path regulating section is formed smaller than the inner diameter of the first aperture, the aforementioned arrangement provides a small-sized lens barrel that ensures unwanted light to be blocked and produces a high-quality image.

Figure 6:
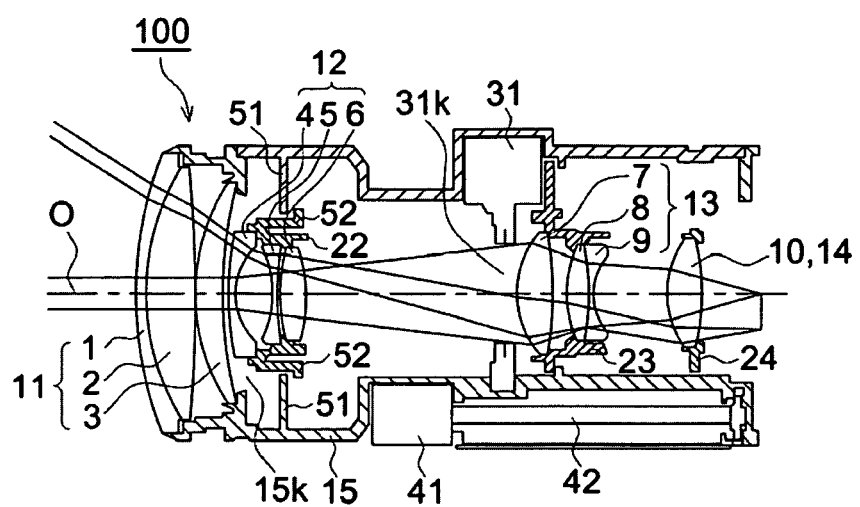
FIG. 6 is a cross sectional view of another example of the lens barrel of the present embodiment.

FIG. 6 is a cross sectional view of another example of the lens barrel 100 of the present embodiment. The following describes only the differences of the lens barrel 100 of FIG. 6 from that of FIGS. 3(a) and 3(b).

The first optical path regulating section 51 formed further down on the image plane side than the first aperture 15k is formed over the entire periphery of the optical axis O, whereby the lens barrel 100 of FIG. 6 is formed. In order not to block the imaging light flux, this first optical path regulating section 51 is formed at the height of the outermost imaging light flux in the variable magnification area of the imaging optical system, or is formed by a slight gap in the outermost imaging light flux, as shown in FIG. 3 (b).

Further, the second optical path regulating section 52 is integrally formed over the entire periphery of the second lens group barrel 22 as the holding frame for holding the second lens group 12 as the moving lens group. The second optical path regulating section 52 is formed further down on the image plane side than the first optical path regulating section 51.

Even when the main barrel 15 is formed slender, the aforementioned arrangement provides a small-sized lens barrel that ensures unwanted light is blocked and produces a high-quality image.

The aforementioned embodiment has been described taking an example from the lens barrel including the 4th group-zoom imaging optical system. It goes without saying that, without being restricted thereto, the present invention is applicable to the blocking of unwanted light when a fixed aperture is provided wherein a moving lens group is sandwiched in-between. The aforementioned embodiment has also been described using an example wherein the second optical path regulating section is formed integrally with the second lens group barrel. Without being restricted thereto, the second optical path regulating section can be made of separate parts and can be built integrally into the second lens group barrel.

What is claimed is:
1. A lens barrel, comprising:
an imaging optical system, including:
a moving lens group comprising one or more lenses that are fixed together by a holding frame, the moving lens group being movable in a direction of an optical axis,
a first aperture in an aperture structure for limiting light admitted to the imaging optical system, the first aperture being disposed on an object side of the moving lens group and being a smallest opening in the aperture structure, and
a second aperture disposed on an image plane side of the moving lens group;
a first optical path regulating section being separated from the aperture structure and extending from a main barrel, the first optical path regulating section being formed on an image plane side of the first aperture, wherein a height between an inner edge in a radial direction of the first optical path regulating section and the optical axis is smaller than an aperture radius of the first aperture and is larger than a radius of an outermost imaging light flux of the imaging optical system at a same position as the first optical path regulating section in a direction of the optical axis; and
a second optical path regulating section integrally formed with the holding frame, wherein a height between an outer edge in the radial direction of the second optical path regulating section and the optical axis is smaller than the aperture radius of the first aperture and is larger than the height between the inner edge of the first optical path regulating section and the optical axis.

2. The lens barrel of claim 1, wherein the second optical path regulating section is disposed on an image plane side of the first optical path regulating section.

3. The lens barrel of claim 1, wherein the first optical path regulating section and the second optical path regulating section are formed in a part of a periphery of the optical axis.

4. The lens barrel of claim 1, wherein the inner edge of the first optical path regulating section is located at an optical axis side with respect to a straight line which connects an edge of the first aperture and an edge of the second aperture in a cross section including the optical axis of the lens barrel.

5. The lens barrel of claim 1, wherein the outer edge of the second optical path regulating section is located at an optical axis side with respect to a straight line which connects an edge of the first aperture and an edge of the second aperture in a cross section including the optical axis of the lens barrel, at least in a part of a range where the second optical path regulating section moves.

6. The lens barrel of claim 1, wherein the outer edge of the second optical path regulating section is located further out than the outermost imaging light flux with respect to the optical axis in all areas where the second optical path regulating section moves.

7. A lens barrel comprising:
an imaging optical system comprising, in the following order from an object side:
(i) a first aperture in an aperture structure for limiting light admitted to the imaging optical system, the first aperture being a smallest opening in the aperture structure and having a first radius;
(ii) a moving lens group movable in a direction of an optical axis; and
(iii) a second aperture having a second radius smaller than the first radius,
wherein the moving lens group is configured to move between the first aperture and the second aperture, and the imaging optical system is configured such that a part of a light flux proceeding from the first aperture toward the second aperture passes through the moving lens group as an imaging light flux; and a main barrel configured to support the first aperture, the moving lens group, and the second aperture, the main barrel comprising:
  a first optical path regulating section extending from the main barrel and formed between the first aperture and a moving area of the moving lens group, wherein a first height between an inner edge in a radial direction of the first optical path regulating section and the optical axis is larger than a maximum radius of the imaging light flux at a same location that the first optical path regulating section is at along the optical axis; and
  a second optical path regulating section integrally formed with a holding frame for holding the moving lens group, wherein a second height between an outermost edge of the second optical path regulating section and the optical axis in the radial direction is larger than the first height, and the outermost edge of the second optical path regulating section is located at an optical axis side with respect to a straight line which connects an edge of the first aperture and an edge of the second aperture in the radial direction when the moving lens group is at a wide-angle end.

8. The lens barrel of claim 7, wherein the second optical path regulating section is disposed on the image plane side of the first optical path regulating section.

9. The lens barrel of claim 7, wherein the first optical path regulating section and the second optical path regulating section are formed in a part of a periphery of the optical axis.

10. The lens barrel of claim 7, wherein the inner edge of the first optical path regulating section in the radial direction is located at the optical axis side with respect to the straight line which connects the edge of the first aperture and the edge of the second aperture in the radial direction.

11. The lens barrel of claim 7, wherein the outer edge of the second optical path regulating section in the radial direction is located further out than the maximum radius of the imaging light flux with respect to the optical axis in all areas where the second optical path regulating section moves.

12. A lens barrel comprising:
  a first aperture in an aperture structure for limiting light admitted to the imaging optical system, the first aperture being a smallest opening in the aperture structure and having a first radius;
  a second aperture having a second radius smaller than the first radius;
  a moving lens group comprising one or more lenses that are held together by a holding frame, the moving lens group being movable between the first aperture and the second aperture along a direction of an optical axis;
  a first optical path regulating section formed between the first aperture and the second aperture, the first optical path regulating section extending from a main barrel towards the optical axis and terminating with an inner edge facing the optical axis; and
  a second optical path regulating section integrally formed with the holding frame,
  wherein a first radial distance from the optical axis to the inner edge is smaller than the first radius and greater than a radius of imaging light flux at the same axial location along the optical axis as the first optical path regulating section, the imaging light flux being light flux that passes through the first aperture, the moving lens group, and the second aperture, and
  wherein a second radial distance from the optical axis to an outermost edge of the second optical path regulating section is smaller than the first radius and greater than the first radial distance.

13. The lens barrel of claim 12, wherein the first optical path regulating section is integrally formed with the main barrel.

14. The lens barrel of claim 12, wherein the first optical path regulating section extends radially along a circumference of the main barrel.

15. The lens barrel of claim 12, wherein the second optical path regulating section comprises a portion that extends radially away from the optical path and terminates with the outermost edge.

16. The lens barrel of claim 12, wherein the second optical path regulating section is disposed on an image plane side of the first optical path regulating section.

17. The lens barrel of claim 12, wherein the first optical path regulating section and the second optical path regulating section are formed in a part of a periphery of the optical axis.

18. The lens barrel of claim 12, wherein the first optical path regulating section is disposed outside of the imaging light flux, and the second optical path regulating section is disposed between the first optical path regulating section and the second aperture.

19. The lens barrel of claim 12, wherein the second radial distance is smaller than the first radius.

20. The lens barrel of claim 12, further comprising a fixed lens group disposed in an object side of the first aperture.

* * * * *